United States Patent [19]

Cotreau

[11] Patent Number: 5,671,272
[45] Date of Patent: Sep. 23, 1997

[54] CURRENT MODE RING TRIP DETECTOR

[75] Inventor: Gerald Michael Cotreau, Melbourne, Fla.

[73] Assignee: Harris Corporation, Melbourne, Fla.

[21] Appl. No.: 380,409

[22] Filed: Jan. 30, 1995

[51] Int. Cl.⁶ .................................................... H04M 3/02
[52] U.S. Cl. ............................ 379/382; 379/377; 379/405
[58] Field of Search ......................................... 379/382, 377, 379/373, 375, 376, 251, 252, 405, 413

[56] References Cited

U.S. PATENT DOCUMENTS

| | | | |
|---|---|---|---|
| 4,995,111 | 2/1991 | Tojo et al. | 379/382 |
| 5,117,452 | 5/1992 | Callele et al. | 379/398 |
| 5,335,271 | 8/1994 | Takato et al. | 379/382 |
| 5,347,575 | 9/1994 | Naseer et al. | 379/377 |
| 5,402,482 | 3/1995 | Minohara et al. | 379/382 |
| 5,422,939 | 6/1995 | Kramer et al. | 379/377 |

*Primary Examiner*—Ahmad F. Matar
*Assistant Examiner*—Jacques M. Saint-Surin
*Attorney, Agent, or Firm*—Rogers & Killeen

[57] ABSTRACT

A circuit and method for sensing in current mode when a telephone has been answered in a telephone system in which an answer is indicated when a dc component of a signal across a resistor exceeds a predetermined reference current. Currents sensed at the terminals of the resistor are combined to provide a third current that includes the dc component, without attenuation of the dc component. A filter separates the dc component from the third current so that the dc component can be compared to the reference current.

16 Claims, 4 Drawing Sheets

CURRENT MODE RING TRIP DETECTOR

BACKGROUND OF THE INVENTION

The present invention relates to telephone system ring trip detectors, and more particularly to current mode circuits and methods for sensing when a telephone has been answered.

Telephone systems sense when a telephone has been answered by determining the difference between two voltages, and evaluating whether a dc component of that difference exceeds a predetermined value. If the value is exceeded, the telephone has been answered.

With reference to FIG. 1, a conventional telephone system 10 includes a ringing generator signal source 12 located at a telephone exchange for providing a ring signal with ac and dc components to a telephone. When a telephone is to be rung, a ring signal is provided from the ring generator 12, across a current limiting resistor 14 (also at the telephone exchange,) through closed switch 16, to the telephone 18, and to ground through closed switch 20. The telephone 18 may be represented by a bell 18a, a capacitor 18b for blocking dc signals, voice circuitry 18c, and a switch hook 18d. Open switches 22 separate the subscriber line interface circuit (SLIC) 24 from the ring signal. The switch hook 18d is open until the telephone is answered, and dc signals are blocked by capacitor 18b. Thus, until the telephone is answered, only the ac component of the ring signal flows through resistor 14. When the telephone is answered, switch hook 18d closes and the dc component of the ring signal reaches ground. The dc component of the ring signal now flows through resistor 14.

The circuit 30 for determining when the telephone has been answered senses when the dc component of the signal across the current limiting resistor 14 exceeds a predetermined value. The circuit 30 typically includes leads from the terminals 32 and 34 of the resistor 14 for sensing the voltages at each side of the resistor. The voltage V1 at terminal 32 may be sensed by resistor 36. The voltage V2 at terminal 34 may be sensed by resistor 38. These voltages are to be compared, but because the voltages are so large (V1 may be 150 volts, and V2 almost as high), they are first reduced by voltage dividers 40 and 42. The voltage dividers 40 and 42 provide lower voltages to an operational amplifier 44 where the voltages are combined to provide an output Vrt that is proportional to the voltage drop across the resistor 14 (i.e., the difference between V1 and V2). A low pass filter 46 separates the dc component of Vrt and provides the dc component Vrtdc to a comparator 48 where it is compared to a reference voltage, Vref. The comparator 48 provides an output Vout indicating that the telephone has been answered when Vrtdc exceeds Vref.

This method is widely used, but has a significant disadvantage, and it is an object of the present invention to obviate this disadvantage. The voltage dividers 40 and 42 reduce the input voltages for the operational amplifier 44 to voltages within the operational amplifier's operating range, but in the process they also reduce the magnitude of the dc component of the ring signal. Errors due to imprecise components in the detector will become relatively larger as the magnitude of the dc component decreases. The comparison of the dc component to the reference becomes more difficult as it is a much smaller value with more precision being required in the detector 10 from resistor 14 to Vout. For example, one method of reducing errors is to provide four precisely matched resistors for the voltage dividers 40 and 42 and resistors 36 and 38.

Another disadvantage of the prior art is the expense of the operational amplifier 44. It is a further object of the present invention to eliminate this element from the ring trip detector circuit.

Accordingly, it is an object of the present invention to provide a novel circuit and method for sensing when a telephone has been answered that obviates the problems of the prior art by operating in the current mode.

It is another object of the present invention to provide a novel circuit and method for sensing when a telephone has been answered in which the magnitude of the dc component is not reduced.

It is still another object of the present invention to provide a novel circuit and method for sensing when a telephone has been answered in which the currents on either side of the current limiting resistor are combined and the magnitude of the combination compared to a reference, without attenuation.

It is yet another object of the present invention to provide a novel circuit and method for sensing when a telephone has been answered in which the current mirrors are used to provide signals from either side of the current limiting resistor with appropriate polarity for combination.

In a further improvement, the present invention addresses the problem of feedthrough from a ring signal to SLIC audio circuitry. Telephone systems may include a ring trip detector in an integrated circuit with a SLIC, and the relatively high voltage ring signal may bleed over from the detector circuitry to the SLIC, degrading SLIC performance. Accordingly, it is a further object of the present invention to provide a clamping circuit that clamps the detector circuitry to ground to thereby prevent feedthrough to the SLIC.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
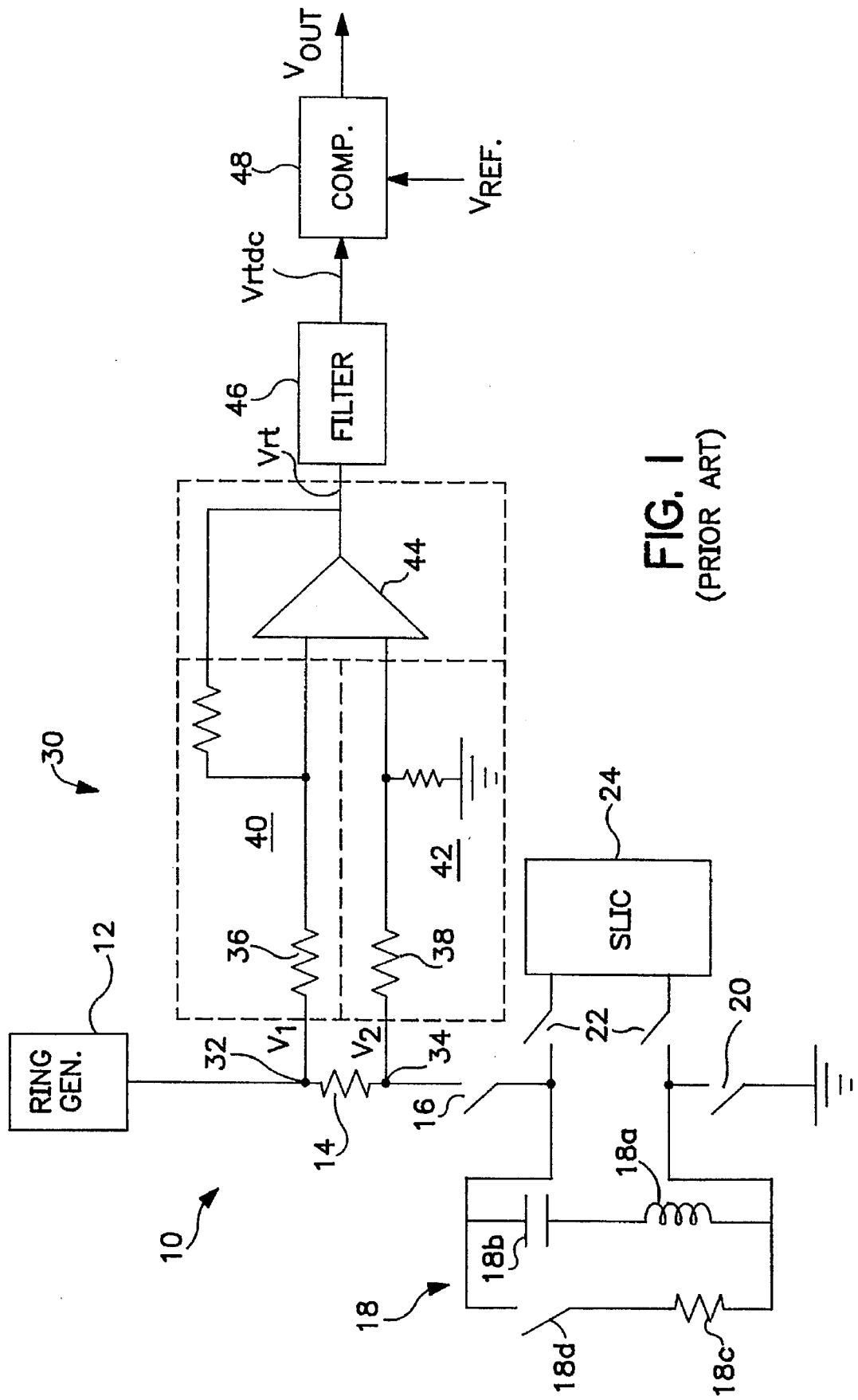
FIG. 1 is a circuit diagram of a ring trip detector circuit of the prior art.
Figure 2:
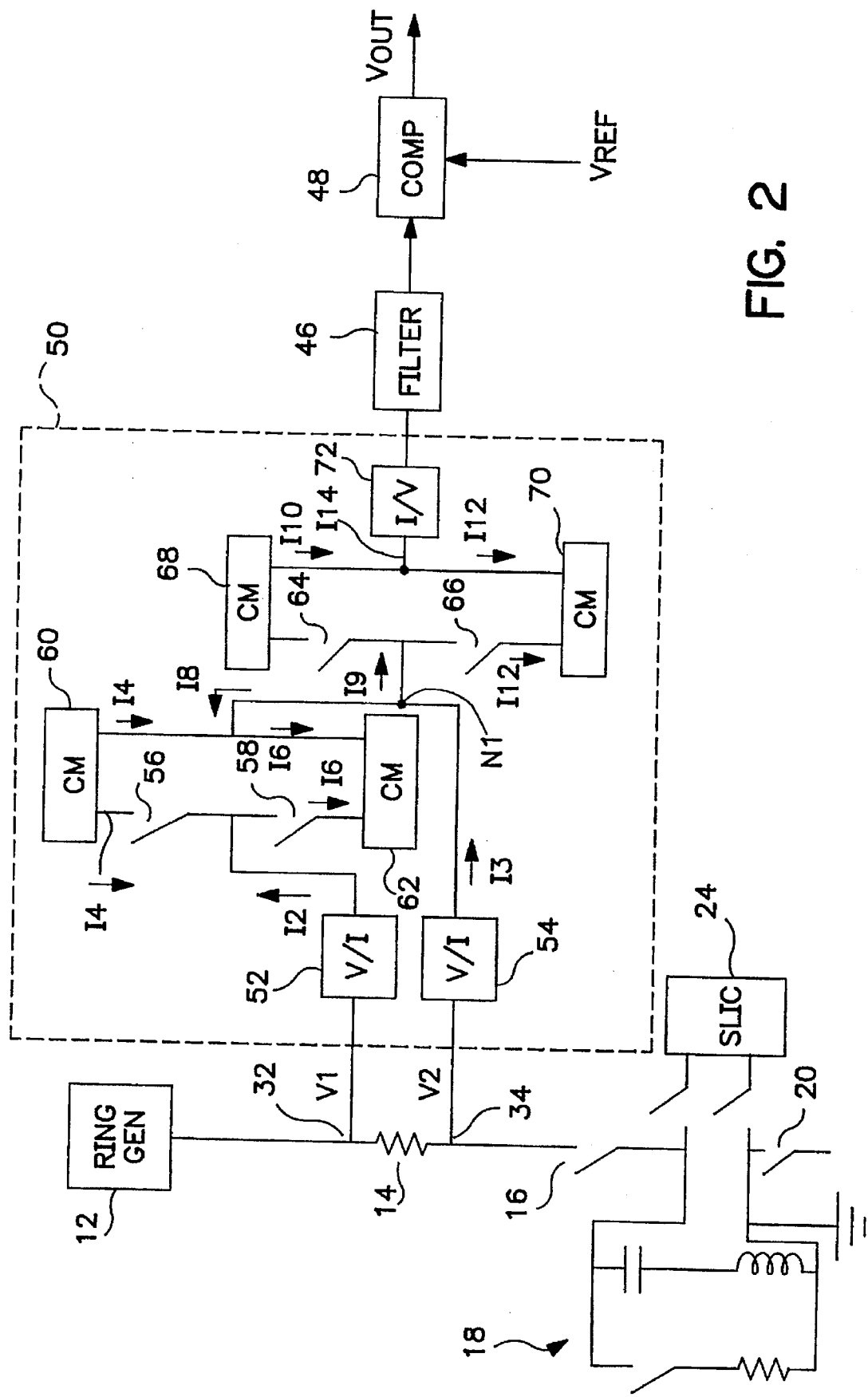
FIG. 2 is a circuit diagram of an embodiment of a current mode ring trip detector of the present invention.

With reference now to FIG. 2, an embodiment of the present invention may include current mode ring trip detector circuitry 50 that operates with conventional telephone systems (the element numbers of some of the conventional elements of FIG. 1 have been maintained in FIG. 2 in the interest of clarity). The circuitry 50 receives signals from terminals 32 and 34 on each side of the resistor 14, and provides an output signal to a filter for separation of the dc component and subsequent comparison to a reference. Signals from terminals 32 and 34 may be converted to currents I2 and I3 by voltage-to-current converters 52 and 54 and provided to node N1 where the two currents are combined to form a third current, the dc component of which is proportional to the dc voltage component of the signal across resistor 14. In contrast to the prior art, the circuit operates in current mode, and, by way of further example, the magnitude of the dc component is substantially unchanged, and an operational amplifier and precisely matched resistors are not required.

The polarity of the signals from terminals 32 and 34 may be set so that the signal to the filter 46 is proportional to the difference V1 minus V2. To this end, current I2 may be provided to paired switches 56 and 58 that provide a virtual ground to converter 52. The ring generator voltage V1 appears entirely across the converter 52 so that current I2 is linearly proportional to the ring generator voltage V1. The switches 56 and 58 may be arranged so that when the ring generator voltage V1 is positive, switch 56 closes and current I2 is provided through a current mirror 60 as current I4. Conversely, when ring generator voltage V1 is negative, switch 58 closes and current I2 is provided through a current mirror 62 as current I6. The current I8 to node N1 is either equal to I4 or I6 depending on whether the ring generator voltage V1 is positive or negative, and I8 is the negative of I2. That is, if V1 is positive, I8 flows out of node N1, and if V1 is negative, I8 flows into node N1.

The switches 64 and 66 similarly present a virtual ground to converter 54 so that current I3 is linearly proportional to voltage V2. Current I3 is provided to node N1 where it combines with current I8 to form a third current I9 that is equal to the sum of I8 and I3 (also equal to the difference between I3 and I2). Thus, I9 is proportional to the difference V2 minus V1. The switches 64 and 66 may be arranged so that when the voltage V2 is positive, switch 64 closes and current I9 is provided through a current mirror 68 as current I10. Conversely, when voltage V2 is negative, switch 66 closes and current I9 is provided through a current mirror 70 as current I12. The current mirrors 68 and 70 invert I9 so that I14 equals the negative of I9, and I14 is proportional to the desired difference V1 minus V2. Current I14 may be converted to a voltage Vrt in current-to-voltage converter 72.

Figure 3:
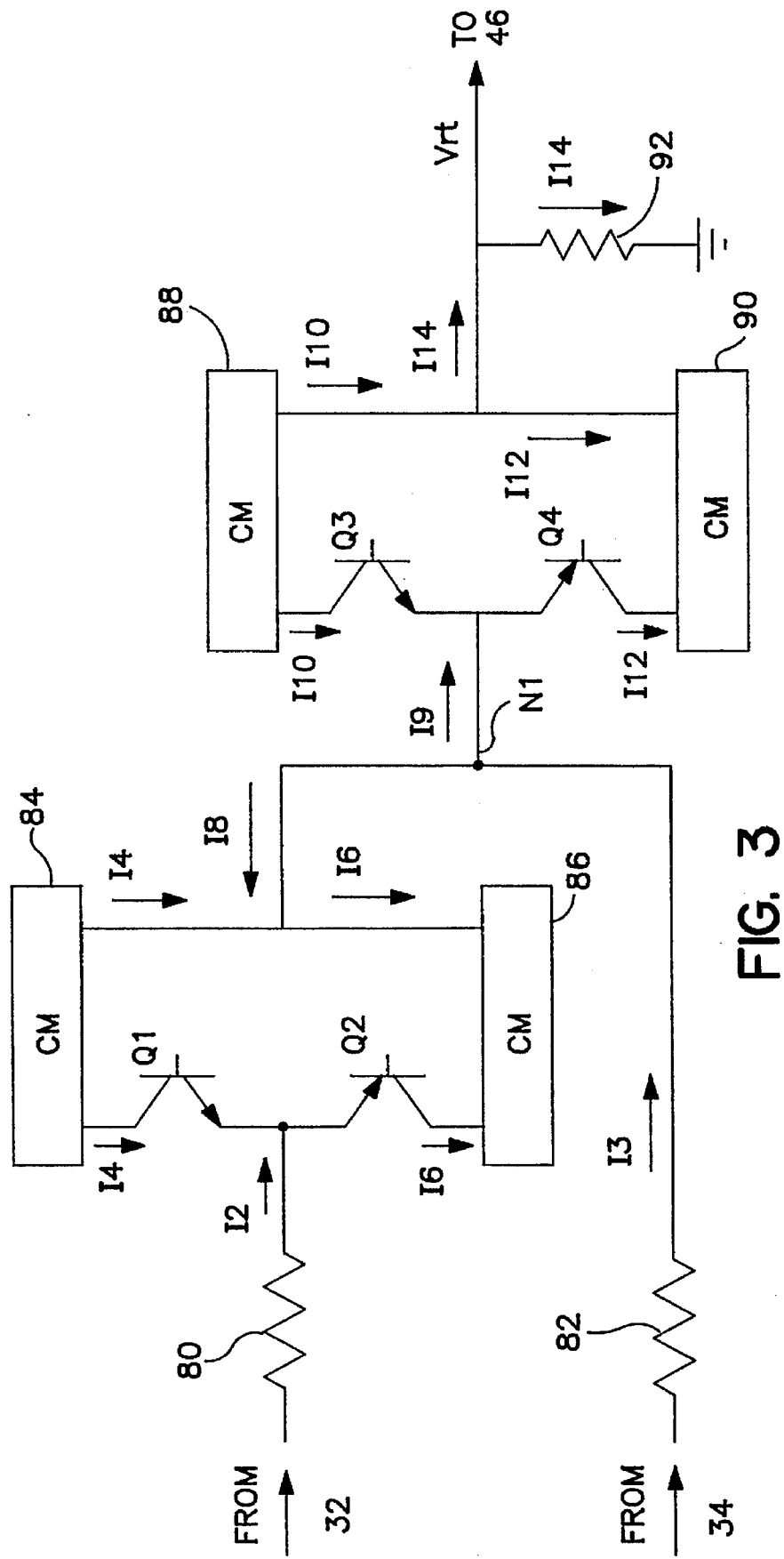
FIG. 3 is a circuit diagram of a further embodiment of a circuit of the present invention.

With reference now to FIG. 3, a preferred embodiment of the circuit may include resistors 80 and 82 for converting voltages V1 and V2 to currents I2 and I3. The switches for setting the correct polarity may be transistors Q1–Q4, that are desirably pairs of PNP and NPN transistors. The current mirrors 84–90 may be conventional current mirrors that provide a reciprocal of an input current. The current-to-voltage converter for providing a voltage Vrt to the filter may be a grounded resistor 92.

The elements of the detector circuitry may be separate components, or may be formed in an integrated circuit in which the pairs of transistors may be complementary. The detector circuitry may be included in a SLIC integrated circuit.

Figure 4:
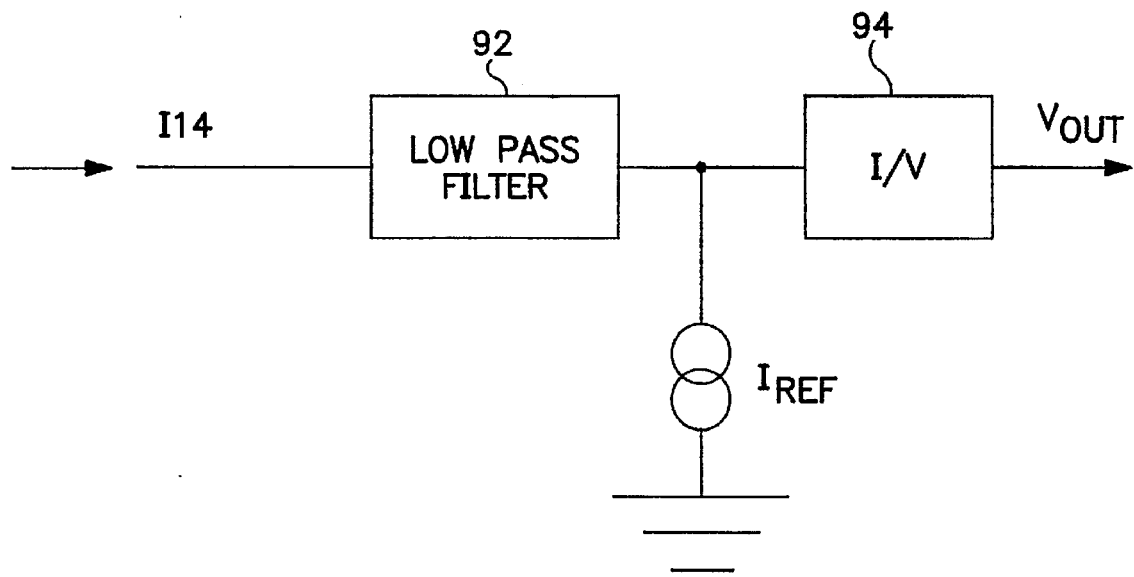
FIG. 4 is a circuit diagram of an alternative embodiment of a filter and comparator of a ring trip detector of the present invention.

In an alternative embodiment illustrated in FIG. 4, the current I14 from the current mirrors 88, 90 may be filtered in low pass filter 92 then compared to a reference current Iref, rather than being converted to a voltage and compared to a reference voltage. A converter 94 may provide an output signal that indicates whether the dc component exceeds the reference.

In a further improvement, and with reference again to FIG. 2, the currents I2 and I3 may be clamped to ground during the period when the switches 16 and 20 are open and the ring generator is still providing a ring signal. This improvement may be beneficial where the ring trip detector circuit is included in the same integrated circuit with the SLIC. As noted above, the ring generator signal provides a voltage V1 to the detector circuit that may couple into the SLIC audio circuitry, degrading SLIC operation.

Figure 5:
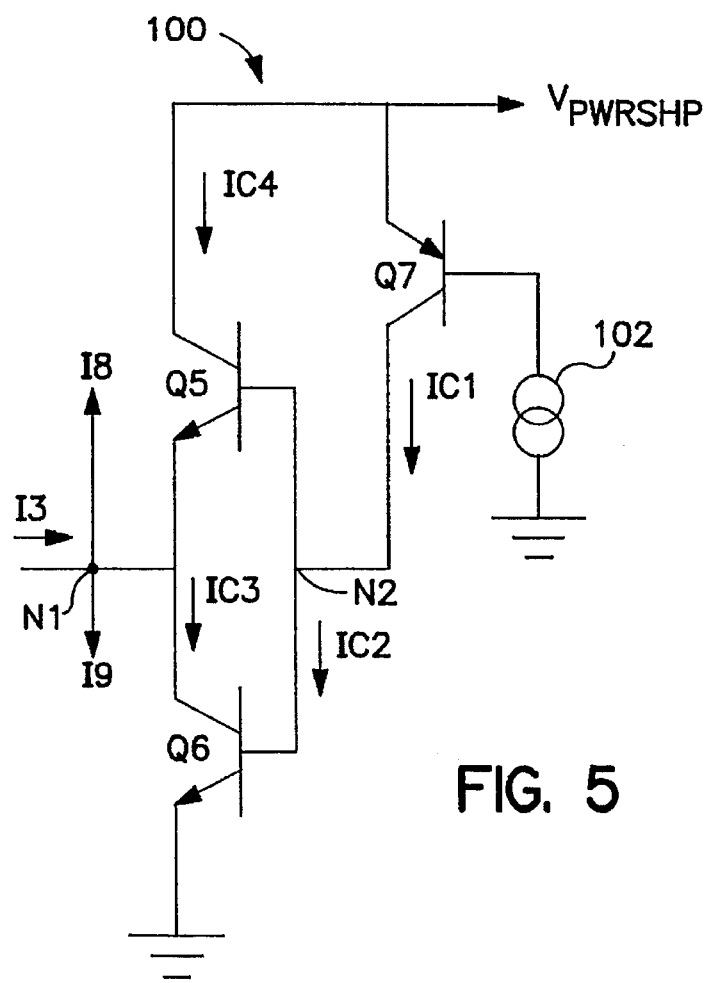
FIG. 5 is a circuit diagram of a clamping circuit of the present invention.

With reference now to FIG. 5, a clamping circuit 100 may receive current I3 by being attached, for example, to node N1 (a similar circuit may be provided for current I2). When the telephone exchange is generating a ring voltage and clamping protection is not needed, current source 102 is off. Transistors Q5, Q6 and Q7 are off and the circuit 100 presents a tri-stated high impedance output to node N1. When the exchange is not ringing a telephone but the ring signal is still being provided, current source 102 is turned on, turning on transistor Q7. Node N2 rises to one Vbe at which point transistor Q6 turns on, pulling node N1 down until transistor Q6 saturates. At that point transistor Q7 collector current Ic1 equals transistor Q5 base current Ic2 and transistor Q5 is heavily saturated. Node N1 is now clamped to ground for both negative and positive currents. For example, if I3 is positive and into the node N1, the low saturated impedance of transistor Q5 holds N1 close to ground and Ic3 equals I3. If I3 is negative the low emitter impedance of transistor Q6 holds node N1 to near ground and Ic4 equals I3. Node N1 is thus restricted to a range near ground of Vsat on the positive side and the delta Vbe of Q5 and Q6 on the negative side. A similar clamping circuit may be provided for I2 as well. The clamping circuit 100 may also find application in prior art detector circuits of the type illustrated in FIG. 1 where it may be attached to voltage dividers 40 and 42.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A circuit for sensing when a telephone has been answered in a telephone system in which an answer is indicated when a dc component of a ring signal across a resistor exceeds a reference current, the circuit comprising:

combining means for combining first and second currents sensed at first and second terminals of the resistor to provide a third current that includes the dc component;

filter means for separating the dc component from said third current so that the dc component can be compared to the reference current; and means for clamping one of said first and second currents to ground when the ring signal is present and a telephone is not being rung.

2. The circuit of claim 1 wherein said combining means comprises first switching means responsive to a polarity of a first voltage at said first terminal of the resistor for providing said first current to a first circuit node, and means for providing said second current to said first circuit node.

3. The circuit of claim 2 wherein said combining means further comprises second switching means responsive to a polarity of a second voltage at said second terminal of the resistor for providing said third current to said filter means.

4. The circuit of claim 1 wherein said combining means comprises a first pair of current mirrors for providing said first current to a first circuit node, and a second pair of current mirrors for providing said third current to said filter means.

5. A circuit for determining when a telephone has been answered in a telephone system in which a ring voltage is provided across a resistor when a telephone is to be rung, an answer being indicated when a dc component across the resistor exceeds a reference, the circuit comprising:

a first voltage-to-current converter for providing a first current proportional to a first voltage at an input to the resistor;

a second voltage-to-current converter for providing a second current proportional to a second voltage at an output from the resistor;

means for combining said first and second currents to provide a third current proportional to the difference between said first and second voltages; and means for clamping a voltage output from said second voltage-to-current converter so that the voltage output cannot go higher or lower, whereby said third current may be used to determine whether the telephone has been answered.

6. The circuit of claim 5 wherein said means for combining comprises:

first switching means responsive to a polarity of said first voltage for providing said first current to a first circuit node;

second switching means responsive to a polarity of said second voltage for providing said second current to said first circuit node, whereby said third current is provided at said first circuit node.

7. The circuit of claim 6 where said first and second switching means each comprise a pair of PNP and NPN transistors for indicating the polarity of respective said first and second voltages.

8. The circuit of claim 6 where said first and second switching means each comprise a pair of current mirrors.

9. The circuit of claim 5 further comprising a current-to-voltage converter for converting said third current to a third voltage; means for providing a dc component of said third voltage; and means for comparing said dc component of said third voltage to the reference.

10. The circuit of claim 5 further comprising means for providing a dc component of said third current; and means for comparing said dc component of said third current to the reference.

11. A circuit for indicating when a telephone has been answered in a telephone system in which a ring voltage is provided across a resistor when the telephone is rung, the answer being indicated when a dc signal across the resistor exceeds a reference current, the circuit comprising:

a first voltage-to-current converter for providing a first current proportional to a first voltage at a first terminal of the resistor;

a first switch for providing said first current to one current mirror in a first pair of current mirrors responsive to a polarity of said first current, said first pair of current mirrors providing said first current to a first node in the circuit;

a second voltage-to-current converter for providing a second current proportional to a second voltage at a second terminal of the resistor, said second current being provided to said first node and combined with said first current to form a third current; and a second switch for providing said third current to one current mirror in a second pair of current mirrors responsive to a polarity of said second current, said second pair of current mirrors providing said third current to means for comparing a dc component of said third current to the reference current.

12. The circuit of claim 11 further comprising a clamp for clamping one of said first and second currents to ground when the ring voltage is being provided and a telephone is not being rung.

13. A clamping circuit for a telephone system in which a ring voltage is provided across a resistor when a telephone is being rung, the clamping circuit comprising:

a connection to current at a terminal of the resistor, a first transistor switch for selectively clamping said connection to ground when a ring voltage is provided and a telephone is not being rung; and a first current source connected to a base of said first transistor switch for operating said first transistor switch.

14. The clamping circuit of claim 13 wherein said connection comprises a pair of transistors connected in series between a power source and ground with their bases connected to a terminal of said first transistor.

15. A method of indicating when a telephone has been answered in a telephone system in which a ringing generator voltage is provided across a resistor at a telephone exchange when the exchange rings the telephone, the answer being indicated when a dc component of a current across the resistor exceeds a reference current, the method comprising the steps of:

(a) converting a first voltage at an input to the resistor to a first current proportional to the first voltage;

(b) converting a second voltage at an output from the resistor to a second current proportional to the second voltage;

(c) combining the first and second currents to provide a third current proportional to the difference between the first and second voltages by providing the first current to a first circuit node with a pair of current mirrors so that the first current has a polarity related to the polarity of the first voltage, providing the second current to the first circuit node with a pair of current mirrors so that the second current has a polarity related to the polarity of the second voltage; and (d) comparing the dc component of the third current to the reference current to determine whether the telephone has been answered.

16. An improved method of indicating when a telephone has been answered in a telephone system in which a ringing voltage is provided across a resistor when the telephone is to be rung, the answer being indicated when a dc component across the resistor exceeds a reference current, the improvement comprising the steps of:

(a) adding currents sensed on either side of the resistor to provide a third current that includes the dc component;

(b) separating the dc component from the third current so that the dc component can be compared to the reference current; and (c) selectively clamping a terminal of the resistor to ground when a ring voltage is provided and a telephone is not being rung.

* * * * *